(12) United States Patent
Pescianschi et al.

(10) Patent No.: US 12,292,328 B2
(45) Date of Patent: May 6, 2025

(54) OPTO-ISOLATOR WITH MEMORY

(71) Applicants: Dmitri Pescianschi, Quedlinburg (DE); Ilya Sorokin, Naples, FL (US)

(72) Inventors: Dmitri Pescianschi, Quedlinburg (DE); Ilya Sorokin, Naples, FL (US)

(73) Assignee: LMPU Holding Corp., Old Westbury, NY (US)

( * ) Notice: Subject to any disclaimer, the term of this patent is extended or adjusted under 35 U.S.C. 154(b) by 0 days.

(21) Appl. No.: 18/744,621

(22) Filed: Jun. 15, 2024

(65) Prior Publication Data

US 2024/0418567 A1    Dec. 19, 2024

Related U.S. Application Data

(60) Provisional application No. 63/521,468, filed on Jun. 16, 2023, provisional application No. 63/521,421, filed on Jun. 16, 2023.

(51) Int. Cl.
| | |
|---|---|
| *G01J 1/42* | (2006.01) |
| *G01J 1/04* | (2006.01) |
| *G02F 1/09* | (2006.01) |
| *G06E 3/00* | (2006.01) |

(52) U.S. Cl.
CPC ............... *G01J 1/42* (2013.01); *G01J 1/0407* (2013.01); *G02F 1/093* (2013.01); *G06E 3/005* (2013.01); *G01J 2001/4242* (2013.01)

(58) Field of Classification Search
CPC ....... H04B 10/801; H04B 10/802; G01J 1/42; G02B 6/42
See application file for complete search history.

(56) References Cited

FOREIGN PATENT DOCUMENTS

WO    WO-0165731 A2  *  9/2001    ........... H04B 10/801

* cited by examiner

*Primary Examiner* — Kevin K Pyo
(74) *Attorney, Agent, or Firm* — Anna Vishev

(57) ABSTRACT

An opto-isolator has a light emitter, at least one light guide, a light recorder optically connected to the light emitter via the light guide, an optical signal modulator optically connected to the light emitter, the light guide or the light recorder, and an optical modulator memory connected to the optical signal modulator. The optical signal modulator modulates an optical signal within the opto-isolator, and is controlled by the optical modulator memory.

6 Claims, 9 Drawing Sheets

OPTO-ISOLATOR WITH MEMORY

CROSS-REFERENCE TO RELATED APPLICATIONS

This application claims all rights of priority to U.S. Provisional Patent Applications Nos. 63/521,421 and 63/521,468, both filed on Jun. 16, 2023.

BACKGROUND

The invention relates to the field of electronics, microelectronics, optoelectronics, information processing, storage and conversion.

A class of components called opto-isolators (also called optocouplers, photocouplers, or optical isolators) are widely used in electronics. These components transmit electrical signals between two isolated circuits by means of light. Opto-isolators prevent voltage from affecting the system receiving the signal.

Opto-isolators are classified according to the type of emitter and type of sensor. According to the type of emitters, there are opto-isolators with incandescent light bulbs; neon lamps; and LEDs. According to the type of sensor, there are opto-isolators with a photoresistor (shown in FIG. 1), a photodiode (shown in FIG. 2), a phototransistor (shown in FIG. 3), a Darlington phototransistor (shown in FIG. 4), a transistor and a diode (shown in FIG. 5), a controlled rectifier (shown in FIG. 6), a TRIAC (shown in FIG. 7), a photovaractor (shown in FIG. 8), an optocoupler with an open optical communication channel (shown in FIG. 9), and an optocoupler with controlled optical communication channel (shown in FIG. 10).

Optocouplers with controlled optical communication channel, transistor or controlled rectifier opto-pairs can be used for additional signal transmission control (as shown in FIG. 11). Regardless of the specific components used, the element of additional signal control, if present, requires continuous maintenance of the control signal, which increases the complexity of the whole device, reduces its reliability, and increases the energy cost of maintaining the modulating signal.

All types of simple opto-isolators can be described by a general circuit diagram shown in FIG. 12. As shown in FIG. 12, a typical opto-isolator circuit includes a light emitter 1, a light recorder 3 and a light guide 2 optically connecting the light emitter with the light recorder. $U_{in}$ is input voltage of the optocoupler; $I_{in}$ is the input current of the optocoupler; $U_{out}$ is the output voltage of the optocoupler; $I_{out}$ is the output current of the optocoupler; and $\phi$ is the luminous flux.

The above-described conventional opto-isolator with no additional modulation of the transmitted signal, does not provide flexibility and high adaptability desired in modern use. Further, even where some additional modulation is provided, it requires continuous maintenance of the control signal, which increases the complexity of the whole device, reduces its reliability, and increases the energy cost of maintaining the modulating signal.

SUMMARY

In its most general aspect, the invention is an opto-isolator with an additional level of signal modulation and a memory. The opto-isolator has a light emitter, at least one light guide, a light recorder optically connected to the light emitter via the light guide, an optical signal modulator optically connected to the light emitter, the light guide or the light recorder, and an optical modulator memory connected to the optical signal modulator. The optical signal modulator modulates an optical signal within the opto-isolator, and is controlled by the optical modulator memory.

BRIEF DESCRIPTION OF THE DRAWINGS

The invention is illustrated by way of examples which are not a limitation, and the figures of the accompanying drawings in which references denote corresponding parts, and in which.

DETAILED DESCRIPTION OF THE INVENTION

Figure 1:
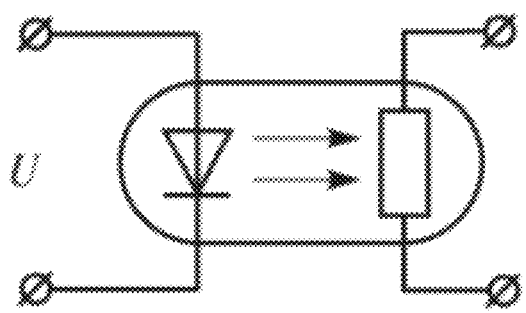
FIG. 1 shows a schematic diagram of an opto-isolator with a photoresistor.
Figure 2:
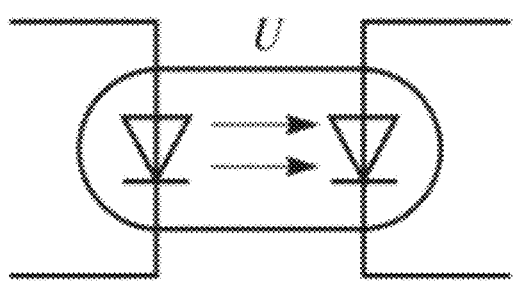
FIG. 2 shows a schematic diagram of an opto-isolator with a photodiode.
Figure 3:
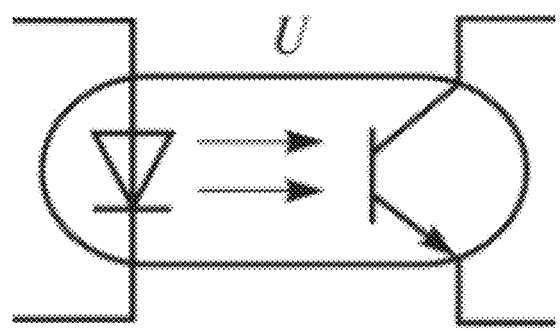
FIG. 3 shows a schematic diagram of an opto-isolator with a phototransistor.
Figure 4:
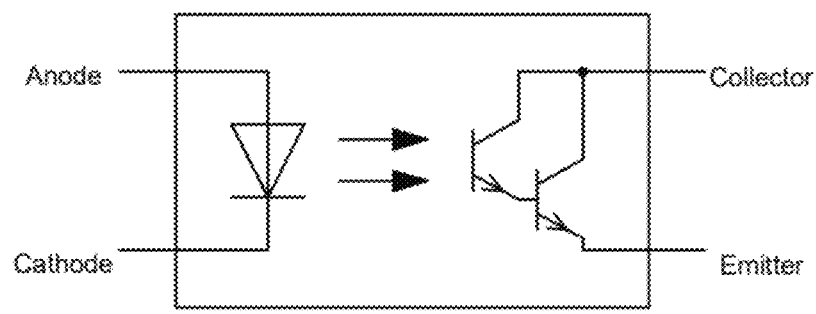
FIG. 4 shows a schematic diagram of an opto-isolator with a Darlington phototransistor.
Figure 5:
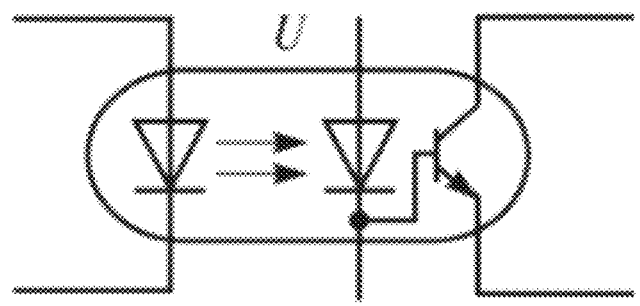
FIG. 5 shows a schematic diagram of an opto-isolator with a transistor and a diode.
Figure 6:
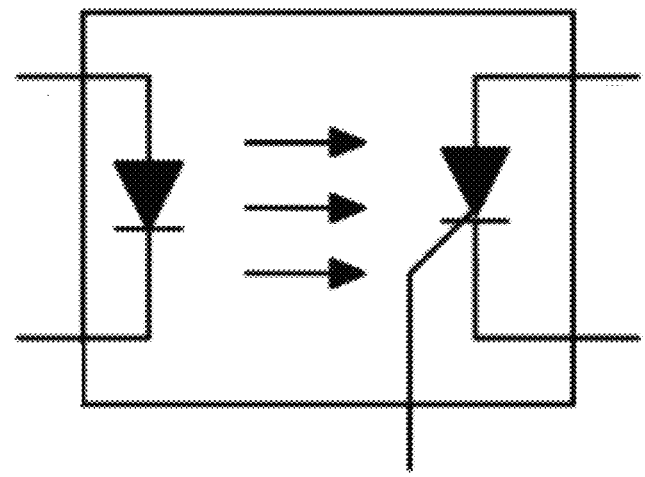
FIG. 6 shows a schematic diagram of an opto-isolator with a controlled rectifier.
Figure 7:
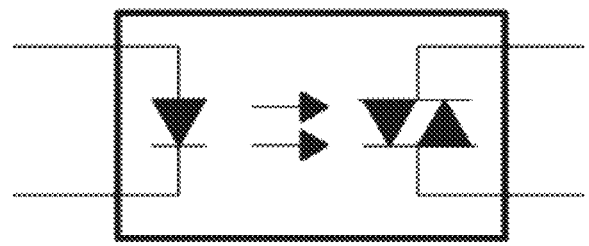
FIG. 7 shows a schematic diagram of an opto-isolator with a TRIAC.
Figure 8:
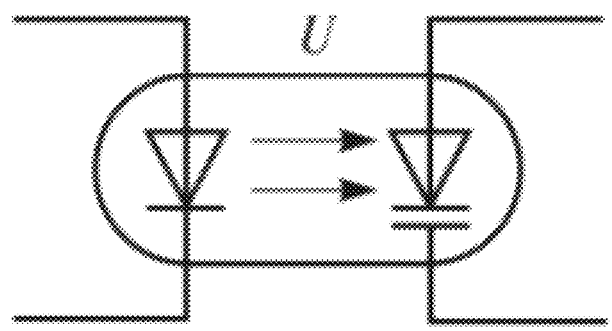
FIG. 8 shows a schematic diagram of an opto-isolator with a photovaractor.
Figure 9:
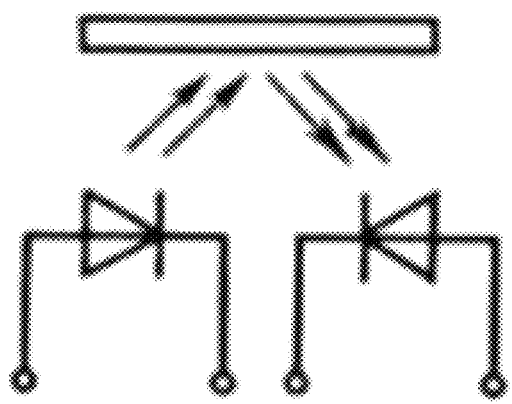
FIG. 9 shows a schematic diagram of an opto-isolator with an optocoupler with an open optical communication channel.
Figure 10:
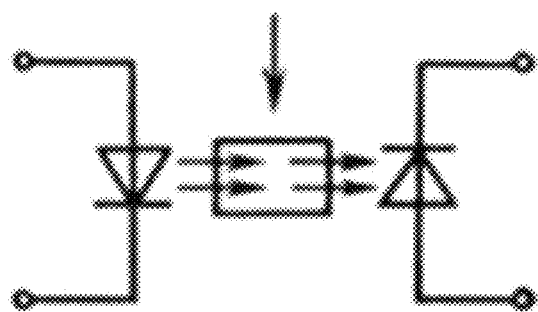
FIG. 10 shows a schematic diagram of an opto-isolator with an optocoupler with controlled optical communication channel.
Figure 11:
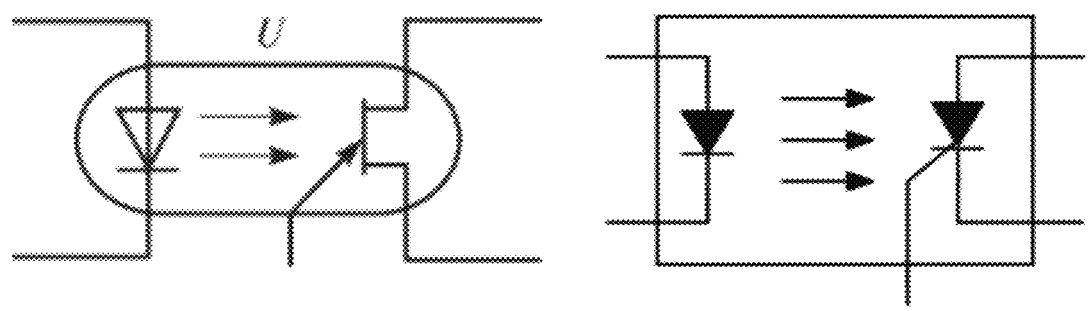
FIG. 11 shows a schematic diagram of an opto-isolator with an additional signal transmission control.
Figure 12:
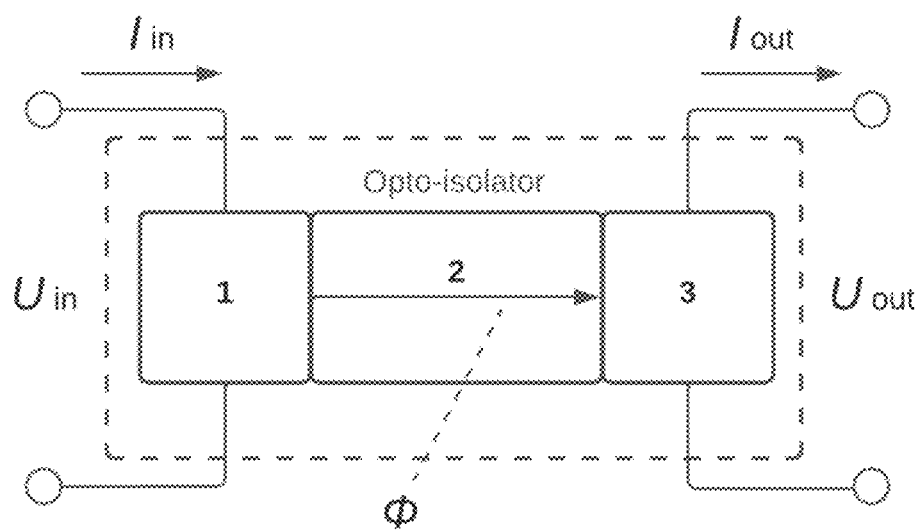
FIG. 12 shows a schematic diagram of a traditional opto-isolator.
Figure 13:
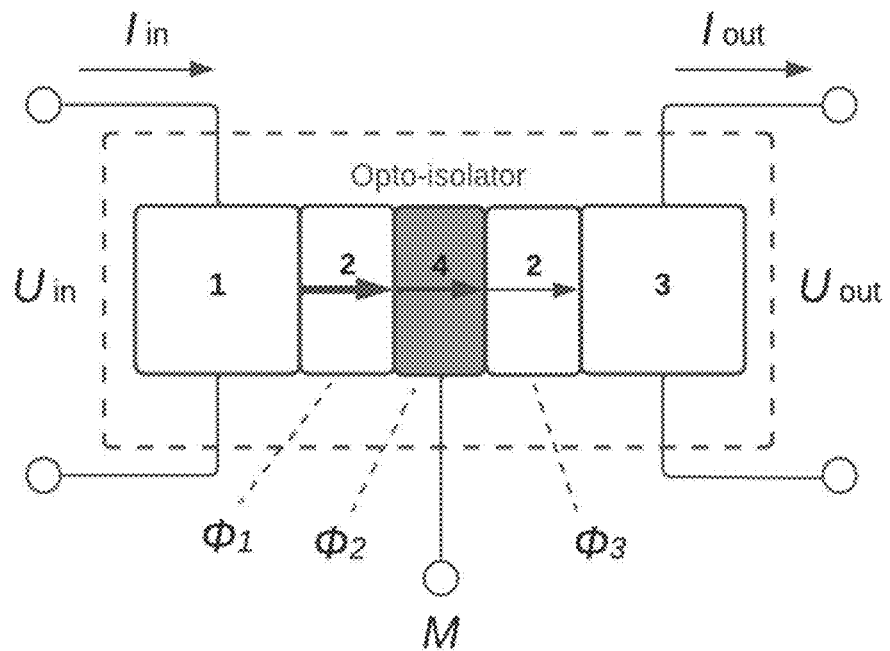
FIG. 13 shows a schematic diagram of an opto-isolator with an additional level of optical signal modulation in accordance with one embodiment of the invention.

As shown in FIG. 13, in its first preferred embodiment, the invention includes an opto-isolator with an optical modulator, preferably comprising a light emitter 1, light guides 2, a light recorder 3, and a controlled optical modulator 4 providing an additional level of optical signal modulation. The light emitter 1 is connected to the first light guide 2. The second light guide 2 is connected to the light recorder 3. The controlled optical modulator 4 is positioned between the first and second light guides 2 and is configured to receive a modulator control signal M. $U_{in}$ is the input voltage of the optocoupler and $I_{in}$ is the input current of the optocoupler. $U_{out}$ is the output voltage of the optocoupler and $I_{out}$ is the output current of the optocoupler. $\phi_1$ designates a generated luminous flux, $\phi_2$ designates a modifiable luminous flux; and $\phi_3$ designates a modulated luminous flux. Optical modulator 4 can be a photochromic optical modulator, i.e., a light-controlled modulator; an acousto-optic modulator, i.e., an optical modulator controlled by acoustics; or an optical modulator controlled by an electric field, such as a liquid crystal modulator, an electro-optical modulator based on the Kerr effect, the Pockels effect, or based on a Mach-Zehnder interferometer.

Figure 16:
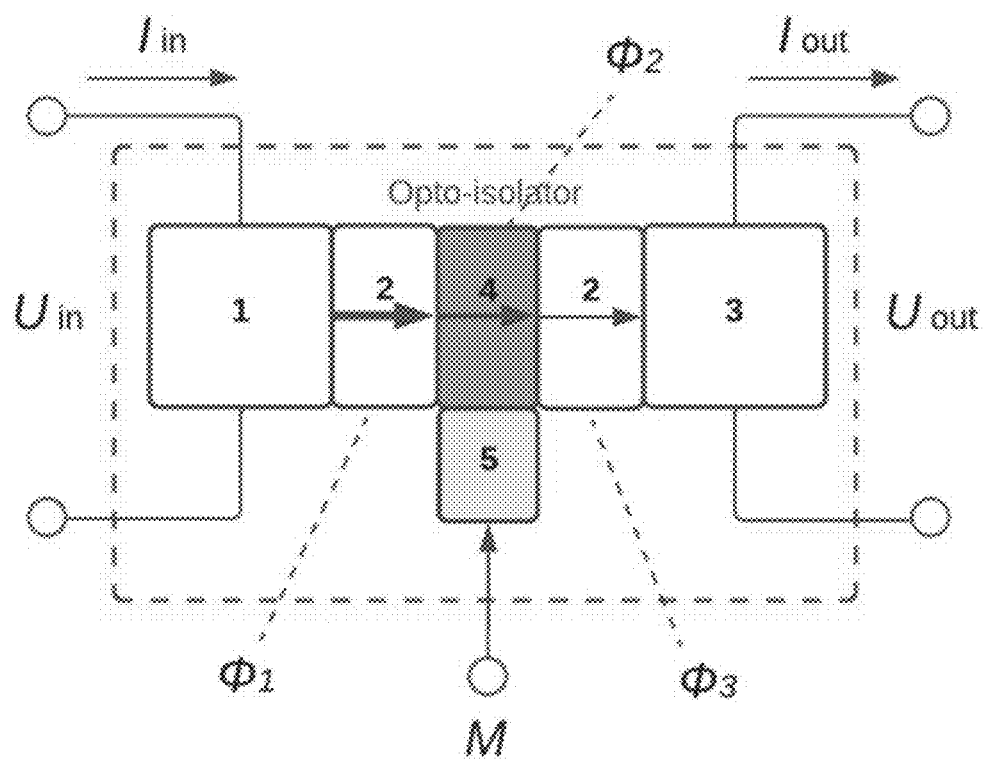
FIG. 16 shows a schematic diagram of an opto-isolator with an additional level of optical signal modulation and an optical modulator memory in accordance with one embodiment of the invention.

As shown in FIG. 16, the above-described first preferred embodiment of the invention is further provided with a memory component. Specifically, the opto-isolator then comprises the light emitter 1, light guides 2, the light recorder 3, a memory-controlled optical modulator 4 and an optical modulator memory 5. Similarly to the first preferred embodiment, the light emitter 1 is connected to the first light guide 2, and the second light guide 2 is connected to the light recorder 3. The controlled optical modulator 4 is positioned between the first and second light guides 2 and is also connected to the optical modulator memory 5, which is configured to receive the modulator memory recording signal M. $U_{in}$ is the input voltage of the optocoupler, and $I_{in}$ is the input current of the optocoupler. $U_{out}$ is the output voltage of the optocoupler, and $I_{out}$ is the output current of the optocoupler. $\phi_1$ is the generated luminous flux, $\phi_2$ is the modifiable luminous flux, and $\phi_3$ is the modulated luminous flux. When using opto-isolators with memory, the level of optical modulation of the signal is preferably stored in the memory 5 of the modulator.

By providing the modulator with the memory component, which stores the predetermined level of modulation of the signal, the inventive opto-isolator ensures stability, autonomy, independence from external fluctuations, and non-volatile modulation of the entire device. There is also no need to constantly maintain the modulation control signal, as, once a particular level of modulation is stored in the memory, it continues to autonomously control modulation at this level.

In the embodiment described above, the optical modulator 4 can be constructed of a material capable of storing the level of modulation in its non-volatile optical properties. In this embodiment, the optical modulator 4 and optical memory 5 become a single unitary component. For example, the material of such unitary component can be diarylethene, and the level of modulation is then stored as concentration of isomers that determine the optical properties of the diarylethene. Alternatively, the unitary component can be made from perovskites or other optical materials, and the level of modulation is then stored as optical properties of perovskites.

Figure 17:
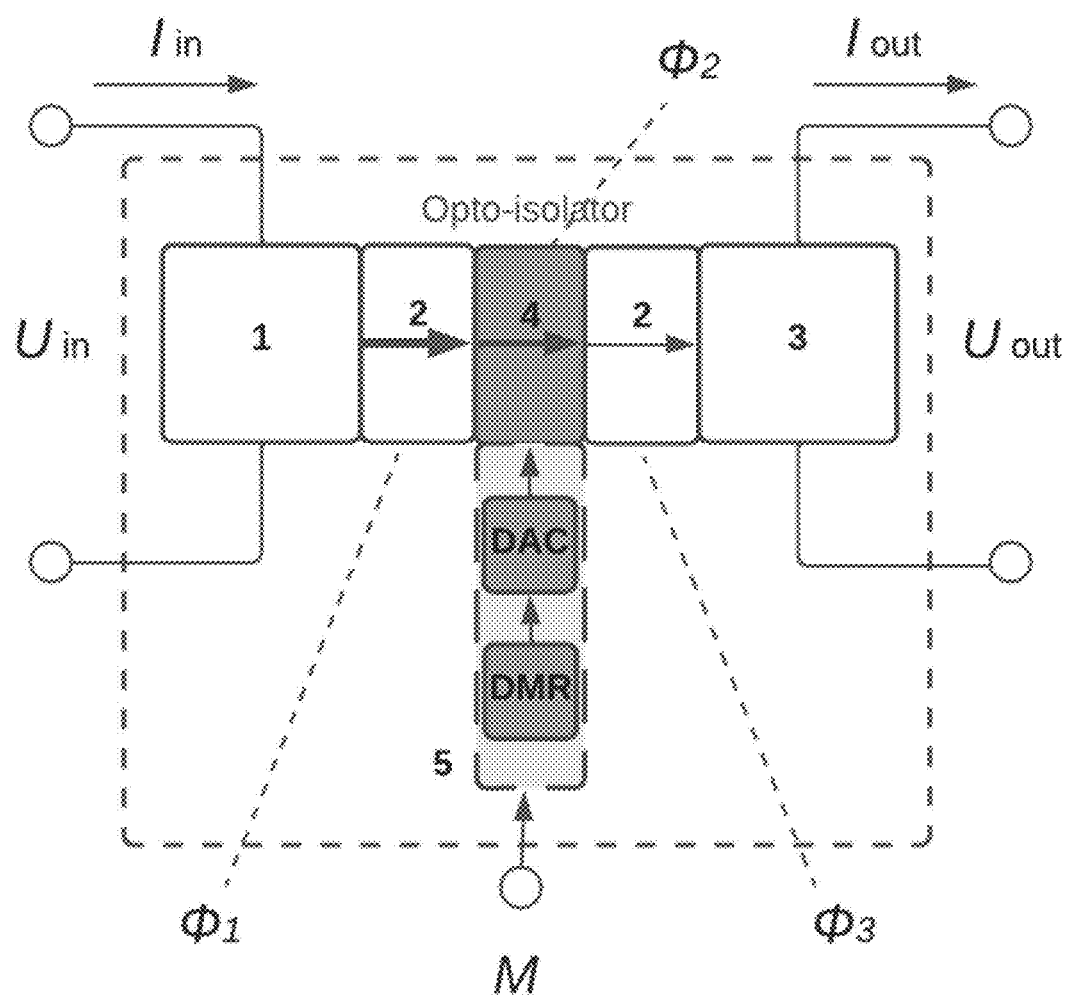
FIG. 17 shows a schematic diagram of the opto-isolator of FIG. 16 where the memory includes a digital memory register and a digital to analog converter.

As shown in FIG. 17, in the above-described first preferred embodiment of the invention, the optical memory 5 can be formed as a digital register storing the modulation level information in digital form. The optical memory component 5 of the opto-isolator then includes a digital memory register DMR and a digital to analog converter DAC.

In all of the disclosed embodiments, the memory component 5 can be constructed as a resistive analog memory based on elements with adjustable resistance, where a specified level of resistance is maintained, for example, based on memristors. Alternatively, the memory component 5 can be a magnetic analog memory based on elements with adjustable magnetization domains, for reading the level of which the Magneto-optic Kerr effect or magnetoresistance can be used. Finally, the memory component 5 can be an electrical analog memory based on cells with adjustable charge levels on capacitors.

Figure 14:
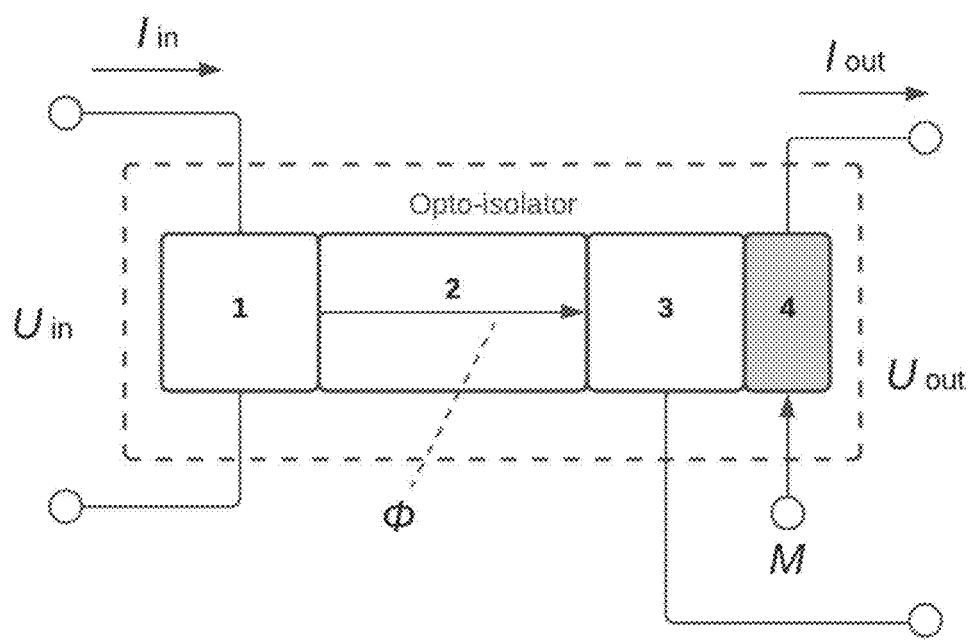
FIG. 14 shows a schematic diagram of an opto-isolator with an additional level of output electronic signal modulation in accordance with another embodiment of the invention.

Another preferred embodiment of the opto-isolator is shown in FIG. 14. In this embodiment, the opto-isolator has an additional level of output electronic signal modulation and includes the light emitter 1, the light recorder 3 and the light guide 2 positioned between the light emitter 1 and the light recorder 3. The controlled electronic modulator 4, in this embodiment, is connected to the light recorder 3 to accomplish the additional level of output electronic signal modulation. Accordingly, the modulator control signal M is applied to the modulator 4 to modulate the recorder output signal. Once again, $U_{in}$ is the input voltage of the optocoupler, $I_{in}$ is the input current of the optocoupler, $U_{out}$ is the output voltage of the optocoupler, $I_{out}$ is the output current of the optocoupler, and $\phi$ is the luminous flux. Similarly to the above, modulator 4 can be a photochromic optical modulator, i.e., a light-controlled modulator; an acousto-optic modulator, i.e., an optical modulator controlled by acoustics; or an optical modulator controlled by an electric field, such as a liquid crystal modulator, an electro-optical modulator based on the Kerr effect, the Pockels effect, or based on a Mach-Zehnder interferometer.

Figure 20:
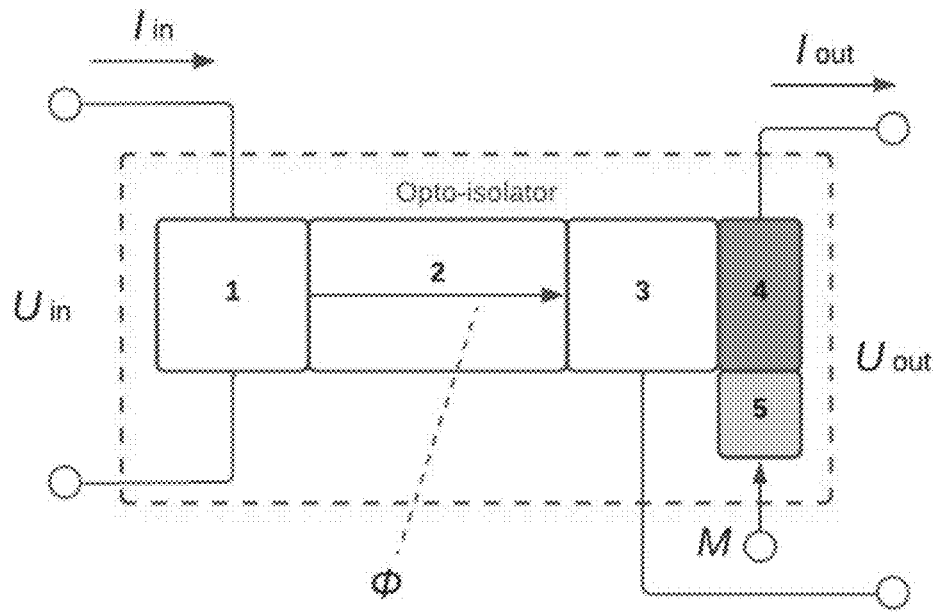
FIG. 20 shows a schematic diagram of an opto-isolator with an additional level of output electronic signal modulation in accordance with another embodiment of the invention and an optical modulator memory in accordance with a further embodiment of the invention.

As shown in FIG. 20, the above-described alternative preferred embodiment of the invention is further provided with a memory component. Specifically, the opto-isolator then comprises the light emitter 1, the light recorder 3 and the light guide 2 positioned between the light emitter 1 and the light recorder 3. The recorder modulator memory 5 is connected to the controlled electronic modulator 4, which, in turn, is connected to the light recorder 3 to accomplish the additional level of output electronic signal modulation. The modulator control signal M is applied to the modulator 4 through the recorder modulator memory 5 to modulate the recorder output signal. Again, $U_{in}$ is the input voltage of the optocoupler, $I_{in}$ is the input current of the optocoupler, $U_{out}$ is the output voltage of the optocoupler, $I_{out}$ is the output current of the optocoupler, and $\phi$ is the luminous flux.

Similarly to the above, in this embodiment, the optical modulator 4 can be constructed of a material capable of storing the level of modulation in its non-volatile optical properties. The optical modulator 4 and optical memory 5 then become a single unitary component.

Figure 21:
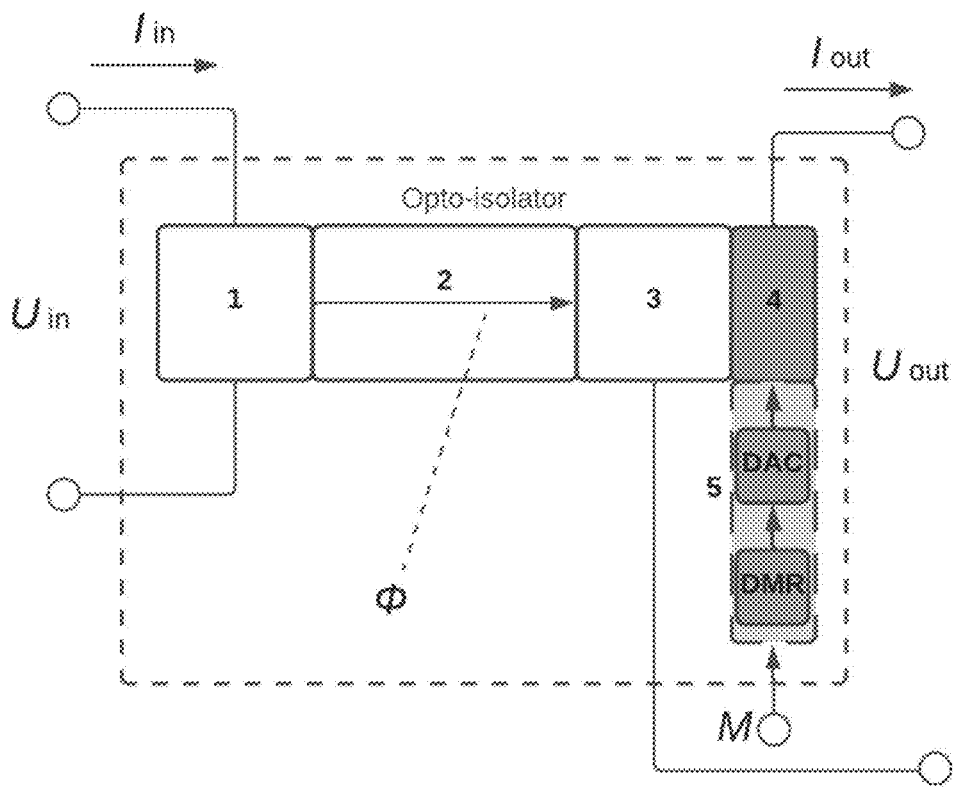
FIG. 21 shows a schematic diagram of the opto-isolator of FIG. 20 where the memory includes a digital memory register and a digital to analog converter.

As shown in FIG. 21, in the above-described alternative preferred embodiment of the invention, the optical memory 5 can be formed as a digital register storing the modulation level information in digital form. The optical memory component 5 of the opto-isolator then includes a digital memory register DMR and a digital to analog converter DAC.

Figure 15:
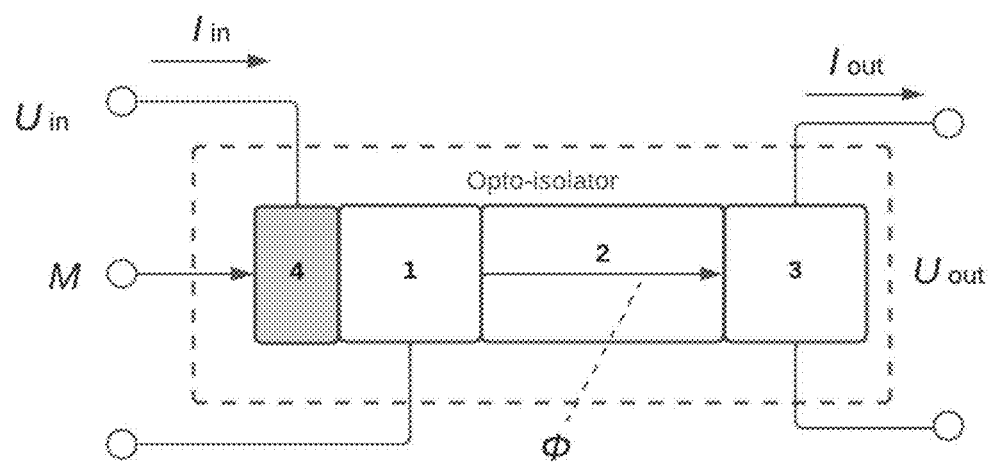
FIG. 15 shows a schematic diagram of an opto-isolator with an additional level of input electronic modulation of the emitted signal in accordance with a further embodiment of the invention.

Another preferred embodiment of the opto-isolator is shown in FIG. 15. In this embodiment, the opto-isolator has an additional level of input electronic signal modulation and includes the light emitter 1 with a connected modulator 4 controlling the brightness of the light emitter, the light recorder 3 and the light guide 2 positioned between the light emitter 1 and the light recorder 3. In this embodiment, the modulator control signal M is supplied to the modulator 4 to control the brightness of the light emitter 1. Similarly to the above, $U_{in}$ is the input voltage of the optocoupler, $I_{in}$ is the input current of the optocoupler, $U_{out}$ is the output voltage of the optocoupler, $I_{out}$ is the output current of the optocoupler, and $\phi$ is the luminous flux. Similarly to the above, modulator 4 can be a photochromic optical modulator, i.e., a light-controlled modulator; an acousto-optic modulator, i.e., an optical modulator controlled by acoustics; or an optical modulator controlled by an electric field, such as a liquid crystal modulator, an electro-optical modulator based on the Kerr effect, the Pockels effect, or based on a Mach-Zehnder interferometer.

Figure 18:
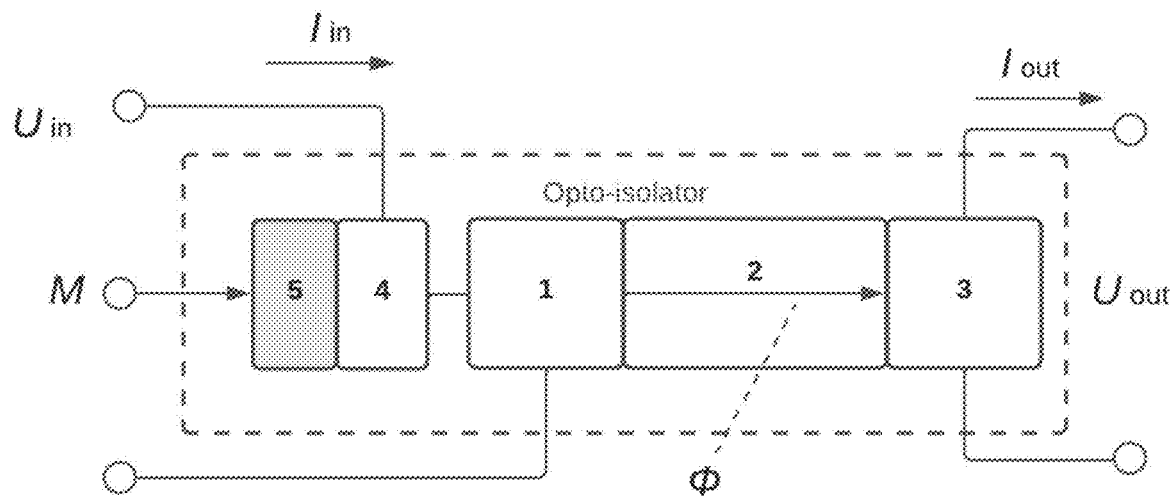
FIG. 18 shows a schematic diagram of an opto-isolator with an additional level of input signal modulation and an optical modulator memory in accordance with another embodiment of the invention.

As shown in FIG. 18, this additional preferred embodiment of the invention is further provided with a memory component. Specifically, the opto-isolator then comprises the comprises the light emitter 1 with connected transmitter brightness modulator memory 5 and modulator 4 controlling the brightness of the light emitter. The opto-isolator also comprises the light recorder 3 and the light guide 2 positioned between the light emitter 1 and the light recorder 3. The modulator control signal M is supplied to the transmitter brightness modulator memory 5 to control the brightness of the light emitter 1 through the modulator 4. Similarly to the above, $U_{in}$ is the input voltage of the optocoupler, $I_{in}$ is the input current of the optocoupler, $U_{out}$ is the output voltage of the optocoupler, $I_{out}$ is the output current of the optocoupler, and $\phi$ is the luminous flux.

Similarly to the above, in this embodiment, the optical modulator 4 can be constructed of a material capable of storing the level of modulation in its non-volatile optical properties. The optical modulator 4 and optical memory 5 then become a single unitary component.

Figure 19:
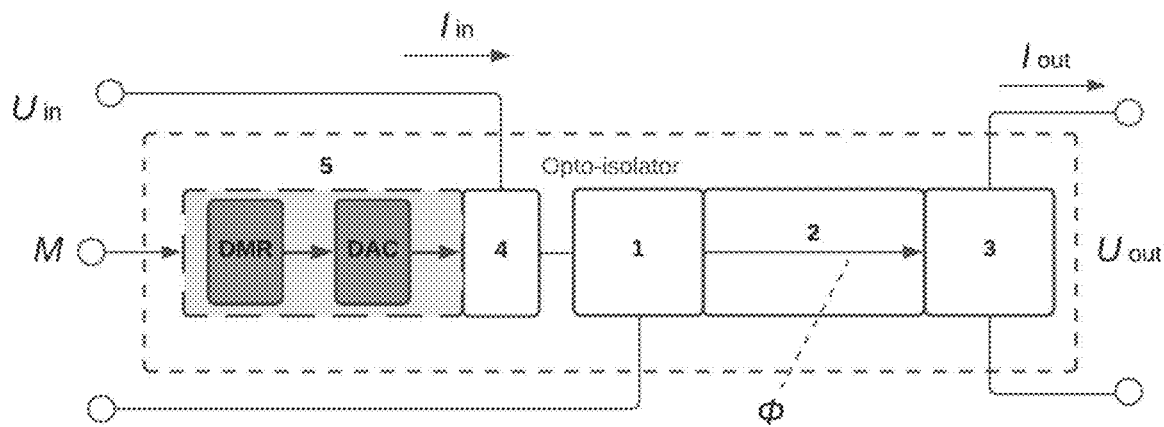
FIG. 19 shows a schematic diagram of the opto-isolator of FIG. 18 where the memory includes a digital memory register and a digital to analog converter.

As shown in FIG. 19, in this preferred embodiment of the invention, the optical memory 5 can be formed as a digital register storing the modulation level information in digital form. The optical memory component 5 of the opto-isolator then includes a digital memory register DMR and a digital to analog converter DAC.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

We claim as follows:

1. An opto-isolator comprising:
   a light emitter;
   at least one light guide;
   a light recorder optically connected to said light emitter via said light guide;
   an optical signal modulator optically connected to said light guide, said optical signal modulator being configured to modulate an optical signal within said opto-isolator by modulating a luminous flux within said light guide; and
   a memory component connected to said optical signal modulator, said memory component being configured to record a level of modulation of said optical signal.

2. The opto-isolator according to claim 1, wherein said optical signal modulator and said memory component are formed as a single unitary modulating component.

3. The opto-isolator according to claim 2, wherein said single unitary modulating component is constructed of a material capable of storing the level of modulation in its non-volatile optical properties.

4. The opto-isolator according to claim 3, wherein said material of said unitary modulating component is diarylethene, and wherein the level of modulation is stored as concentration of isomers that determine optical properties of the diarylethene.

5. The opto-isolator according to claim 3, wherein said material of said unitary modulating component is perovskites, and wherein the level of modulation is stored as optical properties of said perovskites.

6. The opto-isolator according to claim 1, wherein said the memory component is a digital register storing a modulation level information in digital form, said memory component further comprising a digital memory register and a digital to analog converter.

* * * * *